(12) United States Patent
Matsubara et al.

(10) Patent No.: US 9,180,886 B2
(45) Date of Patent: Nov. 10, 2015

(54) CONTROL DEVICE FOR VEHICLE

(75) Inventors: Wataru Matsubara, Nisshin (JP); Sei Kojima, Okazaki (JP); Akira Hino, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/382,040

(22) PCT Filed: Feb. 29, 2012

(86) PCT No.: PCT/JP2012/055112
§ 371 (c)(1),
(2), (4) Date: Nov. 19, 2014

(87) PCT Pub. No.: WO2013/128598
PCT Pub. Date: Sep. 6, 2013

(65) Prior Publication Data
US 2015/0134213 A1 May 14, 2015

(51) Int. Cl.
*B60W 10/06* (2006.01)
*B60W 10/107* (2012.01)
*B60W 30/188* (2012.01)
*F02D 29/00* (2006.01)
*F16H 61/66* (2006.01)
*F16H 61/662* (2006.01)

(52) U.S. Cl.
CPC ............ *B60W 30/188* (2013.01); *B60W 10/06* (2013.01); *B60W 10/107* (2013.01); *F02D 29/00* (2013.01); *F16H 61/66272* (2013.01); *F16H 2061/6605* (2013.01)

(58) Field of Classification Search
None
See application file for complete search history.

(56) References Cited

U.S. PATENT DOCUMENTS

| 4,713,987 A * | 12/1987 | Matsumura | B60W 10/06 477/46 |
| 6,080,080 A * | 6/2000 | Bolz | B60W 10/06 477/39 |
| 2009/0298625 A1 * | 12/2009 | Kodama | F16H 61/66259 474/11 |
| 2011/0218718 A1 | 9/2011 | Hattori et al. | |

FOREIGN PATENT DOCUMENTS

| CN | 102272486 A | 12/2011 |
| DE | 11 2010 001 658 T5 | 8/2012 |
| JP | A-2005-170233 | 6/2005 |
| JP | A-2010/53879 | 3/2010 |
| JP | A-2010-249228 | 11/2010 |
| WO | WO 2010/119766 A1 | 10/2010 |

* cited by examiner

*Primary Examiner* — Edwin A Young
(74) *Attorney, Agent, or Firm* — Oliff PLC

(57) ABSTRACT

In a control device for a vehicle on which is mounted a continuously variable transmission capable of mechanically locking a primary pulley at the time of a maximum gear ratio (maximum Low), an idle rotational speed is not always set high to increase a hydraulic pressure at the time of stopping the vehicle. Instead, at the time of stopping the vehicle, when the gear ratio of the continuously variable transmission is the maximum gear ratio, normal idle rotational speed control is performed, and only when the gear ratio is not the maximum gear ratio, idle-up control is performed so that the idle rotational speed is set high, thereby the hydraulic pressure is set high. Thus, by restricting conditions in which the hydraulic pressure is set high by the idle-up control, it is possible to improve fuel efficiency while suppressing generation of a belt slip.

9 Claims, 9 Drawing Sheets

(a)

(b)

CONTROL DEVICE FOR VEHICLE

TECHNICAL FIELD

The present invention relates to a control device for a vehicle on which an engine and a continuously variable transmission are mounted.

BACKGROUND ART

In a vehicle on which an engine (internal combustion engine) is mounted, an automatic transmission that automatically sets an optimal gear ratio between the engine and drive wheels is known as a transmission that appropriately transmits a torque and a rotational speed generated by the engine to the drive wheels according to a travel state of the vehicle. Automatic transmissions mounted on a vehicle include, for example, a planetary gear transmission that sets the gear ratio using a planetary gear device and frictionally engaging elements such as a clutch and a brake, and a belt type continuously variable transmission (CVT) that continuously adjust the gear ratio.

The belt type continuously variable transmission (hereinafter also simply referred to as the "continuously variable transmission") includes: a primary pulley (input side pulley) to which a drive force of the engine is transmitted; a secondary pulley (output side pulley) that is connected to the drive wheels (output shaft); and a belt that is wound on the primary pulley and the secondary pulley. By decreasing a width of a pulley groove of one pulley while increasing the width of the pulley groove of the other pulley, the winding radius (effective diameter) of the belt to each of the pulleys is continuously changed to adjust the gear ratio. Specifically, each of the primary pulley and the secondary pulley includes a fixed sheave and a movable sheave, and the movable sheave is moved forwards and backwards in an axial direction using a hydraulic pressure actuator provided at a rear face side thereof so that the gear ratio is continuously adjusted within the range from the minimum gear ratio γmin (highest speed gear ratio: maximum High) to the maximum gear ratio γmax (lowest speed gear ratio: maximum Low).

In such a continuously variable transmission, a hydraulic pressure supplied from a mechanical oil pump that is driven by the engine is adjusted so that the adjusted hydraulic pressure is supplied to the respective hydraulic pressure actuators of the primary pulley and the secondary pulley, thereby performing speed change control.

For example, when the gear ratio is decreased, the hydraulic pressure (hydraulic pressure for speed change control) in the hydraulic pressure actuator (oil chamber) of the primary pulley is increased so that the groove width of the primary pulley is decreased, thus the winding radius of the belt in the primary pulley is increased. Simultaneously, the hydraulic pressure (hydraulic pressure for clamping force control) in the hydraulic pressure actuator (oil chamber) of the secondary pulley is decreased so that the groove width of the secondary pulley is increased, thus the winding radius of the belt in the secondary pulley is decreased while the belt clamping force is adjusted. In this way, it is possible to change the gear ratio while suppressing a belt slip. Also, when the gear ratio is increased, the hydraulic pressure for speed change control is decreased so that the groove width of the primary pulley is increased, thus the winding radius of the belt in the primary pulley is decreased, while the hydraulic pressure for clamping force control is increased to decrease the groove width of the secondary pulley, thereby increasing the winding radius of the belt in the secondary pulley.

Among the continuously variable transmissions, there is a type that is capable of mechanically locking the primary pulley at the time of the maximum gear ratio γmax. For example, at the time of the maximum gear ratio γmax, the movable sheave of the primary pulley makes contact with a wall on the side of the case, which prevents further movement of the movable sheave (in the direction in which the movable sheave is opened), thereby the primary pulley (movable sheave) is mechanically locked (see, for example, Patent Document 1). With such a configuration of the continuously variable transmission, since the movable sheave of the primary pulley makes contact with the wall on the side of the case at the time of the maximum gear ratio γmax (i.e. the movement of the movable sheave in the direction in which it is opened is prevented), it is possible to maintain (lock) the groove width of the primary pulley by a reaction force (belt tension) of the secondary pulley. Thus, when the gear ratio of the continuously variable transmission is the maximum gear ratio γmax, it is possible to decrease the hydraulic pressure by such a degree that the hydraulic pressure of the primary pulley is not needed to be secured (that the primary pulley can be mechanically locked). That is, at the time of the maximum gear ratio γmax, it is sufficient to secure the hydraulic pressure of only the secondary pulley.

In the art related to control of the continuously variable transmission, the art to secure a restart performance from a stop state of a vehicle is provided, in which the gear ratio of the continuously variable transmission is returned to the maximum decelerating side immediately before the vehicle stops (when the vehicle speed is extremely low), and furthermore an engine torque is temporary increased during turning-to-low (see, for example, Patent Document 2).

CITATION LIST

Patent Documents

[Patent Document 1] JP 2010-053879 A
[Patent Document 2] JP 2005-170233 A

SUMMARY OF INVENTION

Technical Problem

As described above, in the continuously variable transmission capable of mechanically locking the movable sheave of the primary pulley at the time of the maximum gear ratio γmax (maximum Low), when the gear ratio of the continuously variable transmission is the maximum gear ratio γmax at the time of stopping the vehicle, it is sufficient to secure the hydraulic pressure of only the secondary pulley. Thus, the hydraulic pressure can be decreased (i.e. the amount of oil can be decreased).

However, due to a sudden deceleration or other causes (for example, at the time of high oil temperature), there is a case in which the gear ratio of the continuously variable transmission is not returned to the maximum gear ratio γmax at the time of stopping the vehicle. The belt slip and the like may be generated due to lack of the hydraulic pressure if the hydraulic pressure of the primary pulley is decreased when the gear ratio is not returned to the maximum gear ratio γmax at the time of stopping the vehicle. In consideration of the above (i.e. the gear ratio is not returned to the maximum gear ratio γmax at the time of stopping the vehicle), in the conventional control, an idle rotational speed is always set high at the time of stopping the vehicle so as to secure the hydraulic pressures of both the primary pulley and the secondary pulley. Like this, when the idle rotational speed is always set high at the time of stopping the vehicle, fuel efficiency (fuel consumption rate) is degraded.

As described above with regard to the art of Patent Document 2, it is considered that the gear ratio is certainly returned to the maximum gear ratio γmax by performing the turning-to-low assist control immediately before the vehicle stops. However, in this case, a change in the drive force causes problems.

The present invention was made in consideration of the above circumstances. An object of the present invention is to realize control capable of improving fuel efficiency, in a control device for a vehicle on which mounted a continuously variable transmission capable of mechanically locking a primary pulley at the time of the maximum gear ratio, by restricting conditions in which the idle rotational speed is set high when the vehicle is in a state in which the gear ratio of the continuously variable transmission is the maximum gear ratio (stop state of the vehicle).

Solution to Problem

The present invention is premised on a control device for a vehicle applied to a vehicle on which are mounted an engine and a continuously variable transmission that has a primary pulley to which power of the engine is input, a secondary pulley and a belt wound on the primary pulley and the secondary pulley, and that is capable of mechanically locking the primary pulley at a time of a maximum gear ratio. Such a control device for the vehicle has a technical feature as follows: when a gear ratio of the continuously variable transmission is not the maximum gear ratio although a vehicle state requires the maximum gear ratio (vehicle stop state), idle-up control is executed so that an idle rotational speed of the engine is set higher than that in a case of the maximum gear ratio.

With the present invention, the idle rotational speed is not always set high to increase a hydraulic pressure at the time of stopping the vehicle. Instead, when the gear ratio of the continuously variable transmission is the maximum gear ratio (maximum Low) at the time of stopping the vehicle, normal idle rotational speed control is performed, and only when the gear ratio of the continuously variable transmission is not the maximum gear ratio at the time of stopping the vehicle, the idle-up control is performed so that the hydraulic pressure is set high. Thus, by restricting conditions in which the hydraulic pressure is set high by the idle-up control, it is possible to improve fuel efficiency while suppressing generation of a belt slip and the like.

As a specific configuration of the present invention, it is possible to provide a configuration in which: the control device for the vehicle includes a secondary pulley rotational speed sensor (output shaft rotational speed sensor) that detects a rotational speed of the secondary pulley (output shaft rotational speed), and it is determined whether the gear ratio of the continuously variable transmission is the maximum gear ratio or not when a vehicle speed obtained by an output signal from the secondary pulley rotational speed sensor becomes a predetermined determination threshold value (Thspd 2) at a time of deceleration of the vehicle. In such a case, by setting the determination threshold value based on a lower limit value for the secondary pulley rotational speed sensor to accurately detect the vehicle speed, it is possible to determine whether the gear ratio is the maximum gear ratio or not when the vehicle speed is the lowest within a vehicle speed range where the gear ratio of the continuously variable transmission (input shaft rotational speed Nin/output shaft rotational speed Nout) can be accurately calculated. Thus, the determination of the maximum gear ratio can be performed with further accuracy.

The present invention may be applied to a vehicle including the secondary pulley rotational speed sensor that detects the rotational speed of the secondary pulley and being configured so that: feedforward control based on a target gear ratio and feedback control based on a deviation between the target gear ratio and an actual gear ratio are performable; and furthermore, the feedback control is shifted to the feedforward control when the vehicle speed obtained by the output signal from the secondary pulley rotational speed sensor becomes a predetermined determination threshold value at the time of deceleration of the vehicle. In this case, when the gear ratio of the continuously variable transmission is not the maximum gear ratio although the vehicle state requires the maximum gear ratio, the idle-up control may be started when the feedback control is shifted to the feedforward control. By adopting the above configuration, to the extent that it is possible to perform the appropriate feedback control, the normal idle rotational speed control can be continued as long as possible. Thus, the fuel efficiency can be further improved. Also, the idle-up control can be started immediately after the feedback control is shifted to the feedforward control, thus the belt slip and the like can be further effectively prevented.

In the present invention, the idle-up control is cancelled when a predetermined release condition is established during the idle-up control. Specifically, the idle-up control is cancelled when the vehicle speed becomes more than or equal to the predetermined determination threshold value during the idle-up control. Also, the idle-up control is cancelled when the gear ratio of the continuously variable transmission becomes the maximum gear ratio during the idle-up control. In this way, the idle-up control is cancelled and is not uselessly continued, accordingly the fuel efficiency can be further improved.

The present invention may be applied to a vehicle in which idle stop control is performable to automatically stop the engine when a predetermined stop condition is established and to restart the automatically stopped engine when a redetermined restart condition is established. When the engine is restarted after the engine is automatically stopped in the state in which the gear ratio of the continuously variable transmission is not the maximum gear ratio, the idle-up control is started after an engine rotational speed attains a peak for a first time and before the engine rotational speed attains the idle rotational speed in the case of the maximum gear ratio (normal idle rotational speed). By such an idle-up control at the time of restarting the engine, the required hydraulic pressure can be immediately secured after the engine is restarted. Thus, it is possible to suppress generation of the belt slip and the like at the time of restarting the engine.

The present invention may be applied to the vehicle in which the idle stop control is performable to automatically stop the engine when the predetermined stop condition is established and to restart the automatically stopped engine when the predetermined restart condition is established. When the gear ratio of the continuously variable transmission is not the maximum gear ratio at the time of stopping the vehicle, the engine is automatically stopped under a condition in which a brake stepping force is large compared to the case of the maximum gear ratio. Also, when the engine is automatically stopped in the state in which the gear ratio of the continuously variable transmission is not the maximum gear ratio, the engine is restarted under a condition in which the brake stepping force is reduced from the state in which the brake stepping force is large compared to when the engine is automatically stopped in the case of the maximum gear ratio. In this way, the idle rotational speed is set high at the time of restarting the engine after the engine is automatically stopped in the state in which the gear ratio of the continuously variable transmission is not the maximum gear ratio. Thus, even if a creep force is larger than that in the normal case (creep force in the case of the maximum gear ratio at the time stopping the vehicle), a sudden acceleration of the vehicle can be avoided.

Advantageous Effects of Invention

In the present invention, only when the gear ratio of the belt type continuously variable transmission is not the maximum gear ratio at the time of stopping the vehicle, the idle-up control is performed so that the hydraulic pressure is set high. Thus, it is possible to improve the fuel efficiency while suppressing generation of the belt slip and the like.

DESCRIPTION OF EMBODIMENTS

Hereinafter, description will be given on embodiments of the present invention with reference to the drawings.

Figure 1:
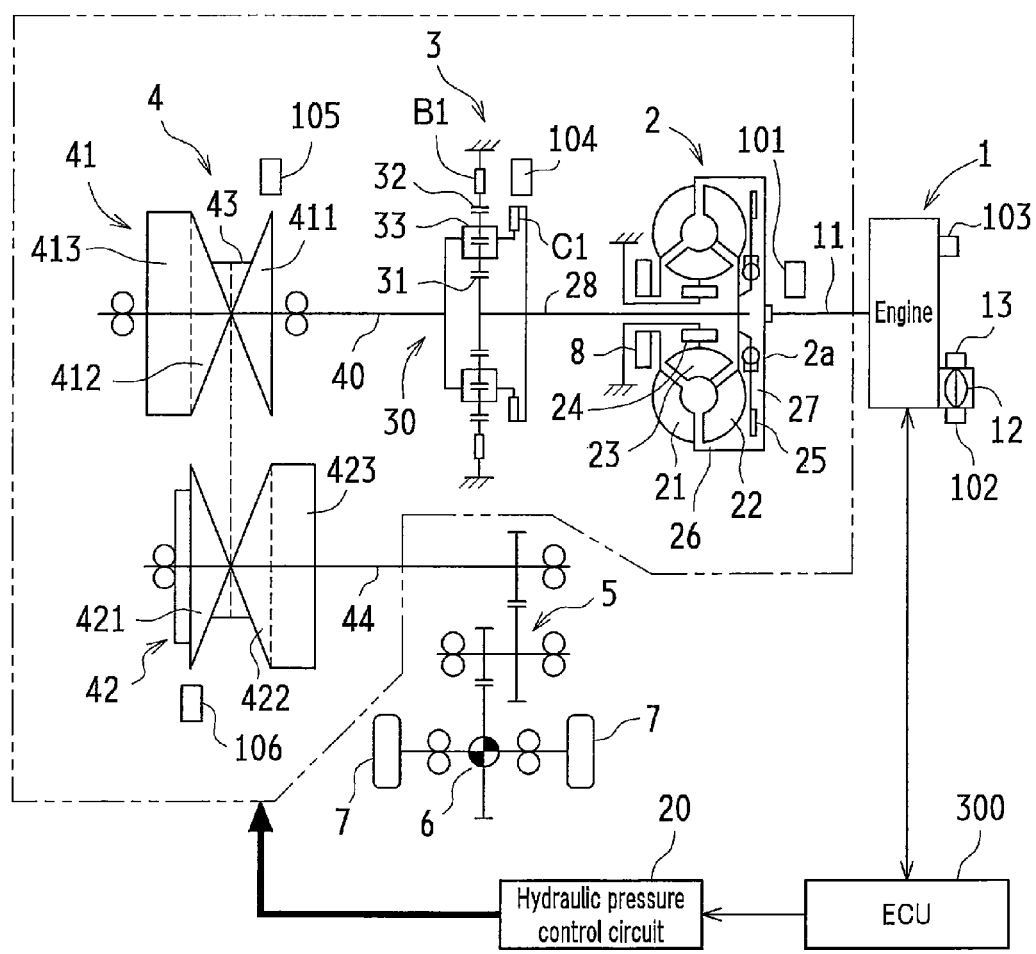
FIG. 1 is a schematic configuration diagram showing one example of vehicles to which the present invention is applied.

FIG. 1 is a schematic configuration diagram showing a vehicle to which the present invention is applied.

A vehicle 100 in this example is an FF (front engine/front drive) type vehicle on which are mounted, for example, an engine (internal combustion engine) 1 as a travel power source, a torque converter 2 as a hydraulic transmission device, a forward/reverse movement switching device 3, a belt type continuously variable transmission (CVT) 4, a reduction gear device 5, a differential gear device 6 and an ECU (Electronic Control Unit) 300.

A crankshaft 11 that is an output shaft of the engine 1 is connected to the torque converter 2. Output from the engine 1 is transmitted from the torque converter 2 to the differential gear device 6 via the forward/reverse movement switching device 3, the belt type continuously variable transmission 4 and the reduction gear device 5 so as to be distributed to the left and right drive wheels 7.

The engine 1, the torque converter 2, the forward/reverse movement switching device 3, the belt type continuously variable transmission 4, a hydraulic pressure control circuit 20 and the ECU 300 are each described below.

—Engine—

The engine 1 is, for example, a multi-cylinder gasoline engine. An intake air amount sucked into the engine 1 is adjusted by an electronically controlled throttle valve 12. The throttle valve 12 can electronically control a throttle opening degree independently from an operation of an accelerator pedal by a driver. The opening degree (throttle opening degree) is detected by a throttle opening degree sensor 102. Also, a cooling water temperature of the engine 1 is detected by a water temperature sensor 103.

The throttle opening degree of the throttle valve 12 is driven and controlled by the ECU 300. Specifically, the throttle opening degree of the throttle valve 12 is controlled so as to obtain an optimal intake air amount (target intake amount) according to an operation state of the engine 1 such as an engine rotational speed Ne detected by an engine rotational speed sensor 101 and an accelerator pedal stepping amount by the driver (accelerator operation amount Acc). More specifically, an actual throttle opening degree of the throttle valve 12 is detected using the throttle opening degree sensor 102, and a throttle motor 13 of the throttle valve 12 is feedback-controlled so that the actual throttle opening degree is matched to the throttle opening degree that can obtain the target intake amount (target throttle opening degree).

—Torque Converter—

The torque converter 2 includes an input shaft side pump impeller 21 and an output shaft side turbine runner 22, a stator 23 that realizes a torque amplification function and a one-way clutch 24. The torque converter 2 transmits power between the pump impeller 21 and the turbine runner 22 via a fluid.

The torque converter 2 includes a lock-up clutch 25 that directly connects the input side and the output side of the torque converter 2. The lock-up clutch 25 is a hydraulic friction cultch that is frictionally engaged with a front cover 2a by a differential pressure (lock-up differential pressure) $\Delta P$ between the hydraulic pressure in an engaging-side oil chamber 26 and the hydraulic pressure in a releasing-side oil chamber 27 (i.e. $\Delta P$=the hydraulic pressure in the engaging-side oil chamber 26—the hydraulic pressure in the releasing side oil chamber 27). By controlling the differential pressure $\Delta P$, the lock-up clutch 25 is completely engaged, half engaged (engaged in a slip state), or released.

By completely engaging the lock-up clutch 25, the pump impeller 21 and the turbine runner 22 are integrally rotated. By engaging the lock-up clutch 25 in a predetermined slip state (half engaged state), the turbine runner 22 is rotated following the pump impeller 21 with a predetermined slip amount during driving. On the other hand, the lock-up clutch 25 is released by setting a negative lock-up differential pressure $\Delta P$.

Also, the torque converter 2 includes a mechanical oil pump (hydraulic pressure generating source) 8 that is driven while connected to the pump impeller 21.

In addition to the mechanical oil pump 8, an electric oil pump (not shown) that is driven by an electric motor and generates the hydraulic pressure may be provided in parallel with the mechanical oil pump 8. For example, when idle stop control is performed, if the engine 1 is stopped and the mechanical oil pump 8 does not generate the hydraulic pressure, the electric oil pump can generate the hydraulic pressure.

—Forward/Reverse Movement Switching Device—

The forward/reverse movement switching device 3 includes a double-pinion type planetary gear system 30, a forward clutch C1 and a reverse brake B1.

A sun gear 31 of the planetary gear system 30 is integrally connected to a turbine shaft 28 of the torque converter 2. A carrier 33 is integrally connected to an input shaft 40 of the belt type continuously variable transmission 4. Also, the carrier 33 and the sun gear 31 are selectively connected via the forward clutch C1. A ring gear 32 is selectively fixed to a housing via the reverse brake B1.

The forward clutch C1 and the reverse brake B1 are hydraulic frictional engagement elements that are engaged/released by the hydraulic pressure control circuit 20 that is described later. By engaging the forward clutch C1 and releasing the reverse brake B1, the forward/reverse movement switching device 3 is integrally rotated, thus a forward power transmission path is established (attained). In such a state, a drive force in the forward direction is transmitted to the belt type continuously variable transmission 4 side.

In contrast, when the reverse brake B1 is engaged and the forward clutch C1 is released, a reverse power transmission path is established (attained) by the forward/reverse movement switching device 3. In such a state, the input shaft 40 is rotated in the reverse direction relative to the turbine shaft 28, thus a drive force in the reverse direction is transmitted to the belt type continuously variable transmission 4 side. When the forward clutch C1 and the reverse brake B1 are both released, the forward/reverse movement switching device 3 enters a neutral state (blocked state) in which power transmission is blocked.

—Belt Type Continuously Variable Transmission—

The belt type continuously variable transmission 4 includes, for example, an input side primary pulley 41, an output side secondary pulley 42 and a metal belt 43 wound between the primary pulley 41 and the secondary pulley 42.

A primary pulley rotational speed sensor 105 is disposed in the vicinity of the primary pulley 41. An input shaft rotational speed Nin of the belt type continuously variable transmission 4 can be calculated based on an output signal from the primary pulley rotational speed sensor 105. Also, a secondary pulley rotational speed sensor 106 is disposed in the vicinity of the secondary pulley 42. An output shaft rotational speed Nout of the belt type continuously variable transmission 4 can be calculated based on an output signal from the secondary pulley rotational speed sensor 106. Furthermore, a vehicle speed spd can be calculated based on the output signal from the secondary pulley rotational speed sensor 106. The primary pulley rotational speed sensor 105 and the secondary pulley rotational speed sensor 106 are both electromagnetic pickup type rotational speed sensors.

The primary pulley 41 is a variable pulley whose effective diameter is variable. The primary pulley 41 is configured with a fixed sheave 411 that is fixed to the input shaft 40 and a movable sheave 412 that is disposed on the input shaft 40 in a slidable manner only in the axial direction. The secondary pulley 42 is also a variable pulley whose effective diameter is variable. The secondary pulley 42 is configured with a fixed sheave 421 that is fixed to an output shaft 44 and a movable sheave 422 that is disposed on the output shaft 44 in a slidable manner only in the axial direction.

On the side of the movable sheave 412 of the primary pulley 41, a hydraulic pressure actuator 413 for changing a V-shaped groove between the fixed sheave 411 and the movable sheave 412 is disposed. Also, on the side of the movable sheave 422 of the secondary pulley 42, a hydraulic pressure actuator 423 for changing a V-shaped groove between the fixed sheave 421 and the movable sheave 422 is disposed.

In the belt type continuously variable transmission 4 with the above configuration, by controlling the hydraulic pressure of the hydraulic pressure actuator 413 of the primary pulley 41, each V-shaped groove of the primary pulley 41 and the secondary pulley 42 is changed, accordingly each contact diameter (effective diameter) of the belt 43 is changed. Thus, a gear ratio γ (γ=primary pulley rotational speed (input shaft rotational speed) Nin/secondary pulley rotational speed (output shaft rotational speed) Nout) is continuously changed. Also, the hydraulic pressure of the hydraulic pressure actuator 423 of the secondary pulley 42 is controlled so that the belt 43 is clamped at a predetermined clamping force at which a belt slip does not occur. The above control is executed by the ECU 300 and the hydraulic pressure control circuit 20.

<Specific Configuration of Peripheral Region of Primary Pulley>

Figure 2:
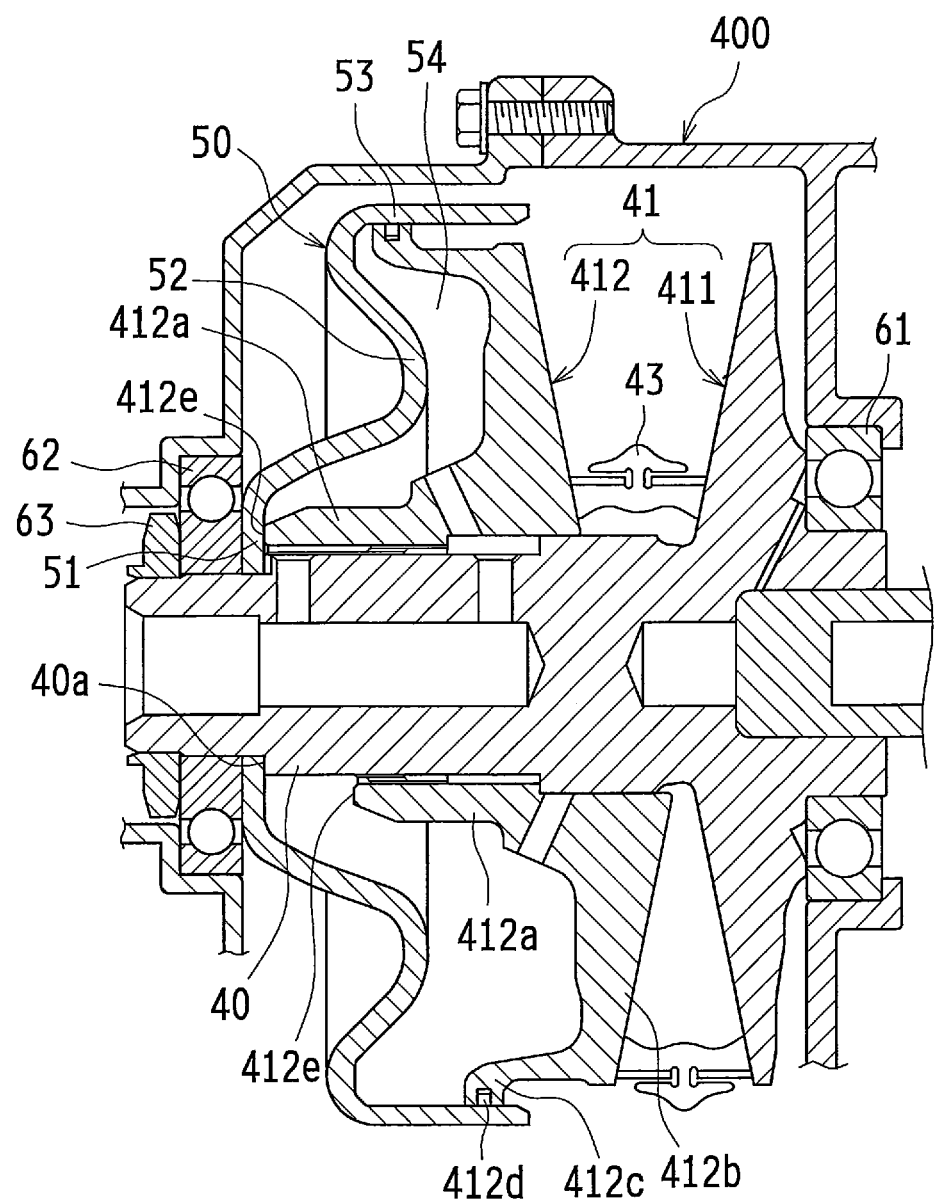
FIG. 2 is a cross-sectional view showing a configuration of a primary pulley and its peripheral region in a belt type continuously variable transmission.

Next, a specific configuration of the primary pulley 41 and its peripheral region in the belt type continuously variable transmission 4 is described with reference to FIG. 2. The upper half of FIG. 2 shows a state in which a winding radius of the belt 43 relative to the primary pulley 41 is decreased (i.e. a state of a maximum gear ratio γmax), and the lower half of FIG. 2 shows a state in which the winding radius of the belt 43 relative to the primary pulley 41 is increased (i.e. a state of a minimum gear ratio γmin).

As described above, the primary pulley 41 includes the fixed sheave 411 integrally formed on the input shaft 40 and the movable sheave 412 disposed in a manner movable forward and backward relative to the fixed sheave 411. The input shaft 40 is rotatably supported by a transmission case 400 via two bearings 61 and 62.

The movable sheave 412 includes: an inner cylinder portion 412a that slides along an outer circumferential surface of the input shaft 40; a radius direction portion 412b that is continuously formed from an end portion of the inner cylinder portion 412a (end portion on the side of the fixed sheave 411) toward the outer peripheral side; and an outer cylinder portion 412c in a substantial cylinder shape that is continuously formed at an outer circumferential end of the radius direction portion 412b and extends toward the opposite direction in which the fixed sheave 411 is disposed.

On the rear side of the movable sheave 412, a cylinder member 50 that constitutes the hydraulic pressure actuator 413 is disposed. The cylinder member 50 includes: an inner radius direction portion 51 that constitutes its inner circumferential portion; an outer radius direction portion 52 that continues from the inner radius direction portion 51 and extends outward so as to be opposite to the rear surface of the radius direction portion 412b of the movable sheave 412; and an cylinder portion 53 that is continuously formed on the outer circumferential side of the outer radius direction portion 52 and is located on the outer circumferential side of the outer cylinder portion 412c of the movable sheave 412.

In the proximity of a tip portion of the input shaft 40, a step portion 40a is formed. The inner radius direction portion 51 of the cylinder member 50 is fixed to the input shaft 40 by a lock nut 63 that is fastened by the outer circumference of the input shaft 40 through the step portion 40a and an inner race of the bearing 62.

The proximity of a tip portion of the outer cylinder portion 412c of the movable sheave 412 makes contact with the inner surface of the cylinder portion 53 of the cylinder member 50 through a seal ring 412d. A sealing surface is formed between the seal ring 412d and the inner surface of the cylinder portion 53. In this way, a space surrounded by the movable sheave 412 and the cylinder member 50 forms a control hydraulic pressure chamber 54 that constitutes the hydraulic pressure actuator 413 of the primary pulley 41. By controlling the hydraulic pressure of the control hydraulic pressure chamber 54 (i.e. controlling the oil amount to be supplied), the position of the movable sheave 412 moving forward/backward relative to the fixed sheave 411 is changed.

In the primary pulley 41 in this example, at the time of the maximum gear ratio γmax, a tip portion 412e (end portion on the opposite side of the fixed sheave 411) of the inner cylinder portion 412a of the movable sheave 412 makes contact with the inner radius direction portion 51 (corresponding to the wall on the side of the case, hereinafter also referred to as a "lock wall 51") of the cylinder member 50, which prevents further movement (in the direction in which the movable sheave 412 is opened, i.e. in the direction separating apart from the fixed sheave 411). See the upper half of FIG. 2. In such a state, by a reaction force (belt tension generated by the clamping force) from the secondary pulley 42, the state in which the movable sheave 412 makes contact with the lock wall 51 is maintained. That is, when the gear ratio of the belt type continuously variable transmission 4 is the maximum gear ratio γmax, the primary pulley 41 (movable sheave 412) is mechanically locked.

—Hydraulic Pressure Control Circuit—

In the hydraulic pressure control circuit 20 of the belt type continuously variable transmission 4, description will be given on the hydraulic pressure control circuit of the hydraulic pressure actuator 413 of the primary pulley 41, the hydraulic pressure control circuit of the hydraulic pressure actuator 423 of the secondary pulley 42 and the like with reference to FIG. 3.

Figure 3:
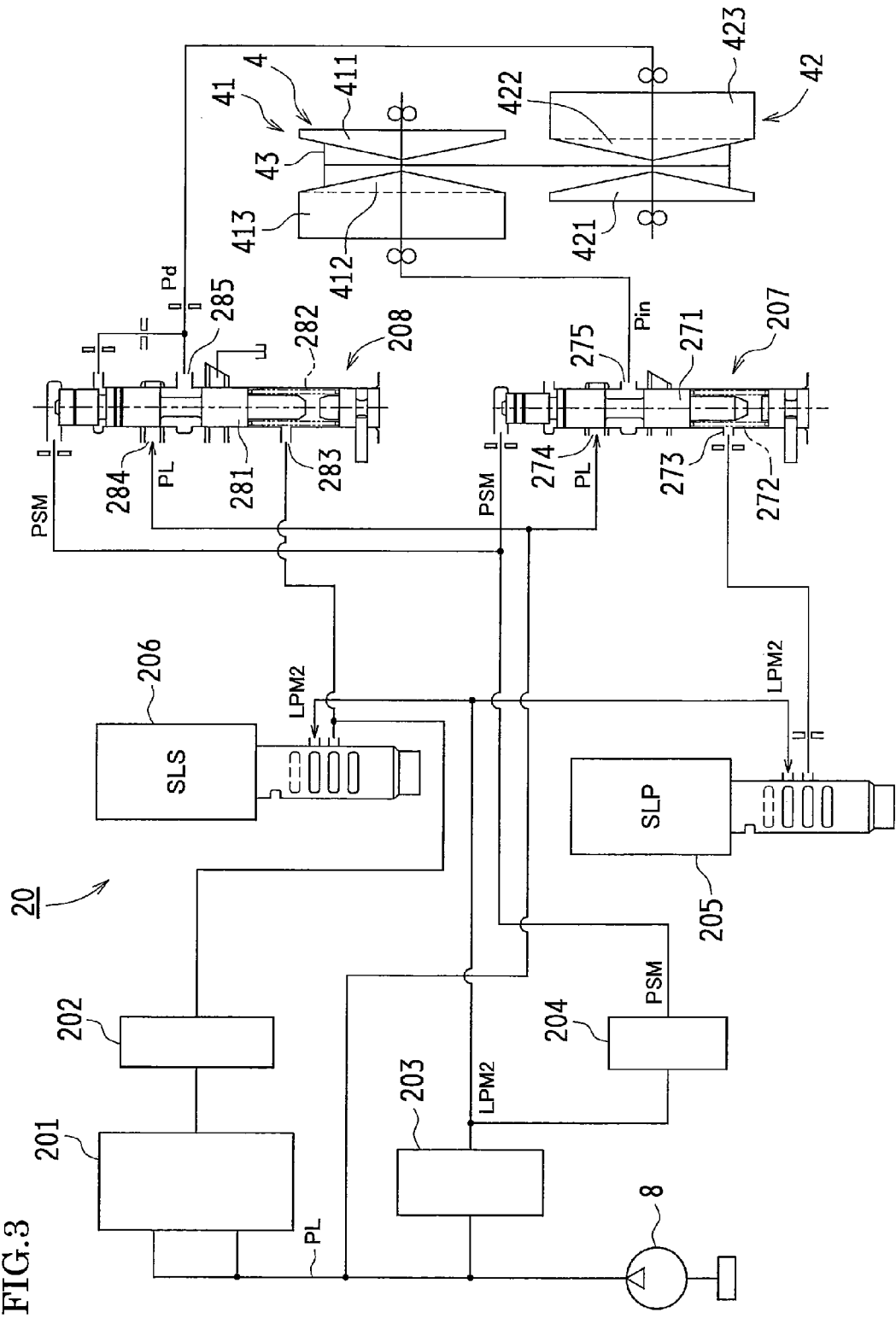
FIG. 3 is a circuit configuration diagram showing a hydraulic pressure control circuit to control a hydraulic pressure of a hydraulic pressure actuator of the primary pulley and a hydraulic pressure of a hydraulic pressure actuator of a secondary pulley of the belt type continuously variable transmission out of the hydraulic pressure control circuits.

The hydraulic pressure control circuit 20 shown in FIG. 3 includes, for example, a primary regulator valve 201, a select valve 202, a line pressure modulator valve 203, a solenoid modulator valve 204, a linear solenoid valve (SLP) 205, a linear solenoid valve (SLS) 206, a speed change control valve 207 and a belt clamping force control valve 208.

In the hydraulic pressure control circuit 20 in this example, the hydraulic pressure generated by the oil pump 8 is adjusted by the primary regulator valve 201, thus a line pressure PL is produced. A control hydraulic pressure output from the linear solenoid valve (SLS) 206 is supplied to the primary regulator valve 201 via the select valve 202. The control hydraulic pressure is used as a pilot pressure for operation. The line pressure PL adjusted by the primary regulator valve 201 is supplied to the line pressure modulator valve 203, the speed change control valve 207 and the belt clamping force control valve 208.

The line pressure modulator valve 203 is a pressure control valve to adjust the line pressure PL adjusted by the primary regulator valve 201 to a constant hydraulic pressure (line pressure LPM2) lower than the line pressure PL. The line pressure LPM2 output from the line pressure modulator valve 203 is supplied to the linear solenoid valve (SLP) 205, the linear solenoid valve (SLS) 206 and the solenoid modulator valve 204.

The solenoid modulator valve 204 is a pressure control valve to adjust the line pressure LPM2 adjusted by the line pressure modulator valve 203 to a constant hydraulic pressure (modulator hydraulic pressure PSM) lower than the line pressure LPM2. The modulator hydraulic pressure PSM output from the solenoid modulator valve 204 is supplied to the speed change control valve 207 and the belt clamping force control valve 208.

The linear solenoid valve (SLP) 205 and the linear solenoid valve (SLS) 206 are normally open type solenoid valves. The linear solenoid valve (SLP) 205 and the linear solenoid valve (SLS) 206 output the control hydraulic pressure (output hydraulic pressure) according to a current value determined by a duty signal (duty value) transmitted from the ECU 300. The control hydraulic pressure output by the linear solenoid valve (SLP) 205 is supplied to the speed change control valve 207. The control hydraulic pressure output by the linear solenoid valve (SLS) 206 is supplied to the primary regulator valve 201 and the belt clamping force control valve 208.

The linear solenoid valve (SLP) 205 and the linear solenoid valve (SLS) 206 may be normally closed type solenoid valves.

Next, the speed change control valve 207 and the belt clamping force control valve 208 are described below.

—Speed Change Control Valve—

As shown in FIG. 3, the speed change control valve 207 is connected to the hydraulic pressure actuator 413 (hereinafter also referred to as the primary side hydraulic pressure actuator 413) of the primary pulley 41 of the belt type continuously variable transmission 4.

The speed change control valve 207 includes a spool 271 that is movable in the axis direction. At one end (lower end in FIG. 3) of the spool 271, a compression coil spring 272 is disposed in a compressed state, and a control hydraulic pressure port 273 is disposed on one side of the lower end. The above-described linear solenoid valve (SLP) 205 is connected to the control hydraulic pressure port 273, and the control hydraulic pressure output by the linear solenoid valve (SLP) 205 is applied to the control hydraulic pressure port 273. Furthermore, the speed change control valve 207 includes an input port 274 to which the line pressure PL is supplied and an output port 275 that is connected (communicated) to the hydraulic pressure actuator 413 of the primary pulley 41.

The speed change control valve 207 uses the control hydraulic pressure output by the linear solenoid valve (SLP) 205 as the pilot pressure to adjust and control the line pressure PL to be supplied to the hydraulic pressure actuator 413 of the primary pulley 41. That is, an output pressure Pin (hereinafter also referred to as the primary sheave hydraulic pressure Pin) of the speed change control valve 207 that is controlled by the linear solenoid valve (SLP) 205 is supplied to the hydraulic pressure actuator 413 of the primary pulley 41. In this way, the hydraulic pressure supplied to the hydraulic pressure actuator 413 of the primary pulley 41 is controlled, thus the gear ratio γ of the belt type continuously variable transmission 4 is controlled.

Specifically, if the control hydraulic pressure output by the linear solenoid valve (SLP) 205 is increased from the state in which the predetermined hydraulic pressure is supplied to the hydraulic pressure actuator 413 of the primary pulley 41, the spool 271 moves upward in FIG. 3. Thus, the output hydraulic pressure Pin of the speed change control valve 207 is increased, and the hydraulic pressure supplied to the hydraulic pressure actuator 413 of the primary pulley 41 is increased. Consequently, the V-shaped groove width of the primary pulley 41 is decreased, accordingly the gear ratio γ is decreased (upshift).

On the other hand, if the control hydraulic pressure output by the linear solenoid valve (SLP) 205 is decreased from the state in which the predetermined hydraulic pressure is supplied to the hydraulic pressure actuator 413 of the primary pulley 41, the spool 271 moves downward in FIG. 3. Thus, the output hydraulic pressure Pin of the speed change control valve 207 is decreased, and the hydraulic pressure supplied to the hydraulic pressure actuator 413 of the primary pulley 41 is decreased. Consequently, the V-shaped groove width of the primary pulley 41 is increased, accordingly the gear ratio γ is increased (downshift).

In this case, a target gear ratio is calculated from a predetermined speed change map using, for example, an accelerator opening degree Acc and the vehicle speed spd as parameters. Thus, in order to match an actual gear ratio to the target gear ratio, the speed change control of the belt type continuously variable transmission 4 is performed according to a deviation between the actual gear ratio and the target gear ratio. Specifically, by controlling the control hydraulic pressure of the linear solenoid valve (SLP) 205, the hydraulic pressure of the hydraulic pressure actuator 413 of the primary pulley 41 of the belt type continuously variable transmission 4 is adjusted and controlled. Thus, the gear ratio γ of the belt type continuously variable transmission 4 is continuously controlled.

—Belt Clamping Force Control Valve—

As shown in FIG. 3, the belt clamping force control valve 208 is connected to the hydraulic pressure actuator 423 (hereinafter also referred to as the secondary side hydraulic pressure actuator 423) of the secondary pulley 42 of the belt type continuously variable transmission 4.

The belt clamping force control valve 208 includes a spool 281 that is movable in the axis direction. At one end (lower end in FIG. 3) of the spool 281, a compression coil spring 282 is disposed in a compressed state, and a control hydraulic pressure port 283 is disposed on one side of the lower end. The above-described linear solenoid valve (SLS) 206 is connected to the control hydraulic pressure port 283, and the control hydraulic pressure output by the linear solenoid valve (SLS) 206 is applied to the control hydraulic pressure port 283. Furthermore, the speed change control valve 207 includes an input port 284 to which the line pressure PL is supplied and an output port 285 that is connected (communicated) to the hydraulic pressure actuator 423 of the secondary pulley 42.

The belt clamping force control valve 208 uses the control hydraulic pressure output by the linear solenoid valve (SLS) 206 as the pilot pressure to adjust and control the line pressure PL to be supplied to the hydraulic pressure actuator 423 of the secondary pulley 42. That is, an output pressure Pd (hereinafter also referred to as the secondary sheave hydraulic pressure Pd) of the belt clamping force control valve 208 that is controlled by the linear solenoid valve (SLS) 206 is supplied to the hydraulic pressure actuator 423 of the secondary pulley 42. In this way, the hydraulic pressure supplied to the hydraulic pressure actuator 423 of the secondary pulley 42 is controlled, thus the belt clamping force of the belt type continuously variable transmission 4 is controlled.

Specifically, if the control hydraulic pressure output by the linear solenoid valve (SLS) 206 is increased from the state in which the predetermined hydraulic pressure is supplied to the hydraulic pressure actuator 423 of the secondary pulley 42, the spool 281 moves upward in FIG. 3. Thus, the output hydraulic pressure Pd of the belt clamping force control valve 208 is increased, and the hydraulic pressure supplied to the hydraulic pressure actuator 423 of the secondary pulley 42 is increased. Consequently, the belt clamping force is increased.

On the other hand, if the control hydraulic pressure output by the linear solenoid valve (SLS) 206 is decreased in the state in which the predetermined hydraulic pressure is supplied to the hydraulic pressure actuator 423 of the secondary pulley 42, the spool 281 moves downward in FIG. 3. Thus, the output hydraulic pressure Pd of the belt clamping force control valve 208 is decreased, and the hydraulic pressure supplied to the hydraulic pressure actuator 423 of the secondary pulley 42 is decreased. Consequently, the belt clamping force is decreased.

In this case, the control hydraulic pressure of the linear solenoid valve (SLS) 206 is controlled based on a predetermined map of a required hydraulic pressure (corresponding to the belt clamping force) using, for example, the accelerator opening degree Acc corresponding to the transmission torque and the gear ratio γ as parameters so that the belt slip does not occur. Thus, the hydraulic pressure (secondary sheave hydraulic pressure Pd) of the hydraulic pressure actuator 423 of the secondary pulley 42 of belt type continuously variable transmission 4 is adjusted and controlled, accordingly the belt clamping force is controlled.

Figure 4:
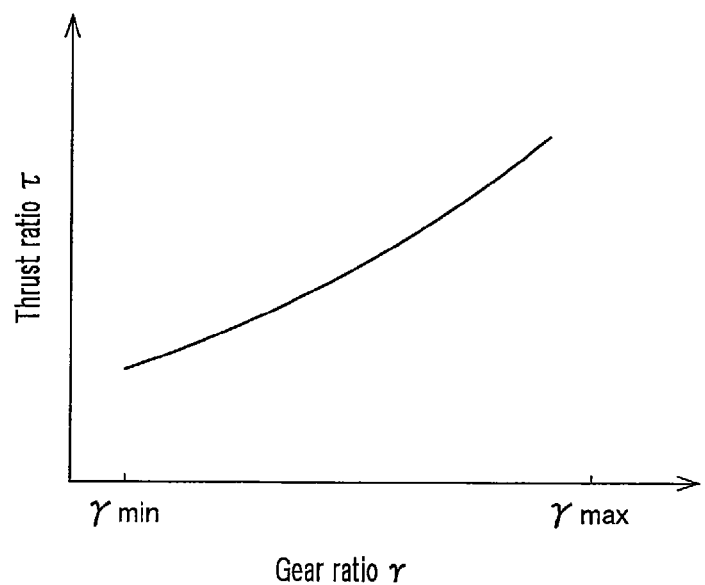
FIG. 4 is a graph showing a thrust ratio map.

As described above, in the speed change control of the belt type continuously variable transmission 4 in which the primary sheave hydraulic pressure Pin and the secondary sheave hydraulic pressure Pd are independently controlled, the primary sheave hydraulic pressure Pin and the secondary sheave hydraulic pressure Pd are controlled so as to maintain a thrust ratio τ (τ=[secondary sheave hydraulic pressure Pd×pressure receiving area of secondary side hydraulic pressure cylinder]/[primary sheave hydraulic pressure Pin×pressure receiving area of primary side hydraulic pressure cylinder]). Specifically, the thrust ratio τ is calculated referring to the thrust ratio map shown in FIG. 4 according to the gear ratio γ. Thus, the primary sheave hydraulic pressure Pin and the secondary sheave hydraulic pressure Pd are controlled so as to be balanced by the calculated thrust ratio τ.

Figure 5:
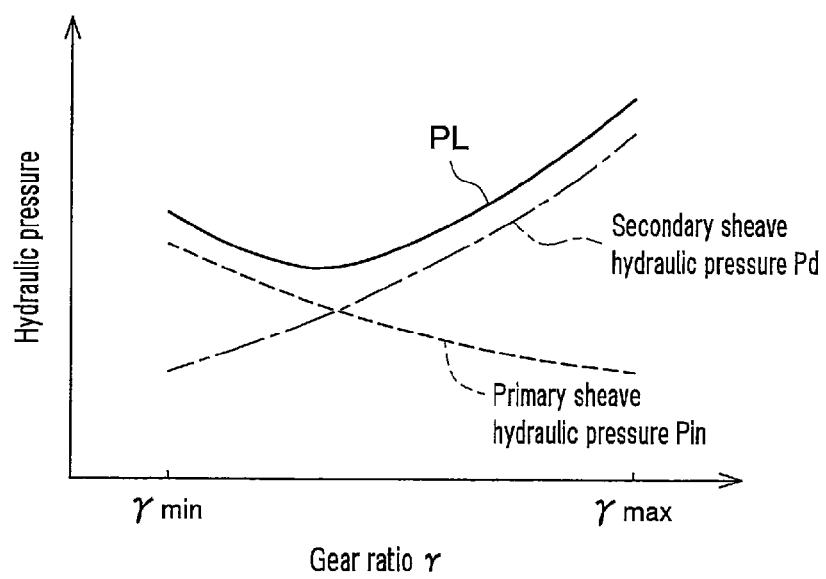
FIG. 5 is a graph showing a relationship between a line pressure, and a primary sheave hydraulic pressure and a secondary sheave hydraulic pressure.

In this example, the line pressure PL adjusted by the primary regulator valve 201 is controlled as shown in FIG. 5. That is, the line pressure PL is controlled so as to be a high value by a predetermined margin relative to the secondary sheave hydraulic pressure Pd in a region where the gear ratio γ of the belt type continuously variable transmission 4 is on a low side (large side), and so as to be a high value by a predetermined margin relative to the primary sheave hydraulic pressure Pin in a region where the gear ratio γ is on a high side (small side). By the above control, it is possible to set the minimum required hydraulic pressure so as to obtain the secondary sheave hydraulic pressure Pd and the primary sheave hydraulic pressure Pin. Thus, energy loss can be prevented due to useless output of the hydraulic pressure.

The above speed change control of the belt type continuously variable transmission 4 and the hydraulic pressure control including the line pressure PL control are performed by the hydraulic pressure control circuit 20 and the ECU 300.

—ECU—

Figure 6:
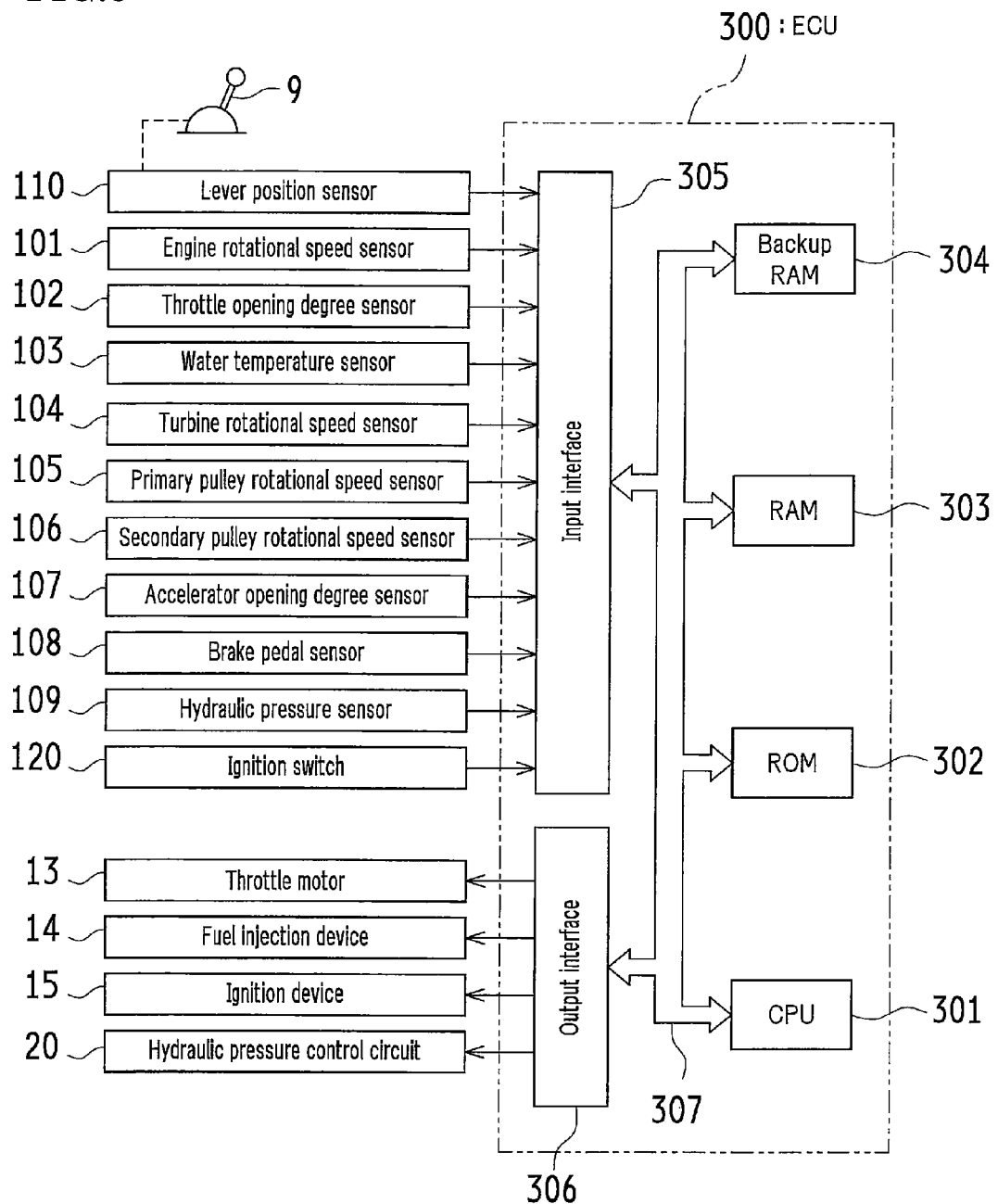
FIG. 6 is a block diagram showing a configuration of a control system such as an ECU.

As shown in FIG. 6, the ECU 300 includes, for example, a CPU (central processing unit) 301, a ROM (read only memory) 302, a RAM (random access memory) 303 and a backup RAM 304.

The ROM 302 stores, for example, various control programs and maps to be referred to when executing the various control programs. The CPU 301 executes computing processing based on the various control programs and the maps stored in the ROM 302. The RAM 303 is a memory for temporary storing computation results by the CPU 301 and data input from respective sensors. The backup RAM 304 is a nonvolatile memory for storing data to be stored when the engine 1 is stopped.

The CPU 301, the ROM 302, the RAM 303 and the backup RAM 304 are connected to each other, and also to an input interface 305 and an output interface 306, via a bus 307.

To the input interface 305 are connected, for example, the engine rotational speed sensor 101, the throttle opening degree sensor 102, the water temperature sensor 103, a turbine rotational speed sensor 104, the primary pulley rotational speed sensor 105, the secondary pulley rotational speed sensor 106, an accelerator opening degree sensor 107, a brake pedal sensor 108 that detects an operation amount of the brake pedal (brake stepping force), a hydraulic pressure sensor 109 that detects the secondary sheave hydraulic pressure Pd and a lever position sensor 110 that detects a lever position (operational position) of the shift lever 9. Output signals of those respective sensors, such as the rotational speed of the engine 1 (engine rotational speed) Ne, the throttle opening degree θth of the throttle valve 12, the cooling water temperature Tw of the engine 1, a rotational speed of the turbine shaft 28 (turbine rotational speed) Nt, the primary pulley rotational speed (input shaft rotational speed) Nin, the secondary pulley rotational speed (output shaft rotational speed) Nout, the operational amount of the accelerator pedal (accelerator opening degree) Acc, the operational amount of the brake pedal (brake stepping force), the secondary sheave hydraulic pressure Pd of the belt type continuously variable transmission 4 and the lever position (operational position) of the shift lever 9, are supplied to the ECU 300. An ignition switch 120 is connected to the input interface 305. An ignition-on (IG-ON) signal and an ignition-off (IG-OFF) signal from the ignition switch 120 are supplied to the ECU 300.

To the output interface 306 are connected, for example, the throttle motor 13, a fuel injection device 14, an ignition device 15 and the hydraulic pressure control circuit 20.

Here, among the signals supplied to the ECU 300, the turbine rotational speed Nt is matched to the primary pulley rotational speed (input shaft rotational speed) Nin during forward travel in which the forward clutch C1 of the forward/reverse movement switching device 3 is engaged, and the secondary pulley rotational speed (output shaft rotational speed) Nout corresponds to the vehicle speed spd. Also, the accelerator operation amount Acc indicates a requested output amount by the driver.

The shift lever 9 is selectively operated to respective positions such as a parking position 'P' for parking the vehicle, a reverse position 'R' for reverse travel, a neutral position 'N' where power transmission is blocked, a drive position 'D' for forward travel, and a manual position 'M' where the gear ratio γ of the belt type continuously variable transmission 4 can be increased/decreased by a manual operation during forward travel.

In the manual position 'M' are provided, for example, a downshift position and an upshift position for increasing/decreasing the gear ratio γ, or a plurality of range positions with which a range can be selected from the plurality of speed change ranges having respectively the upper limits (side where the gear ratio γ is small) that differ from each other.

The lever position sensor 110 includes a plurality of ON/OFF switches or the like to detect that the shift lever 9 is operated, for example, to the parking position 'P', the reverse position 'R', the neutral position 'N', the drive position 'D', the manual position 'M', the upshift position, the downshift position or the range position. In order to change the gear ratio γ by the manual operation, it is possible to provide, apart from the shift lever 9, a downshift switch and an upshift switch, or a lever or the like, on a steering wheel or the like.

The ECU 300 executes, based on the output signals of the above various sensors, output control of the engine 1, the above-described gear ratio control and the belt clamping force control of the belt type continuously variable transmission 4 and engagement/release control of the lock-up clutch 25 and the like. Furthermore, the ECU 300 executes control at the time of stopping the vehicle described later. Here, "at the time of stopping the vehicle" includes the time immediately before the vehicle stops.

The output control of the engine 1 is executed by the throttle motor 13, the fuel injection device 14, the ignition device 15, the ECU 300 and the like. As the control of the engine 1, the ECU 300 executes idle rotational speed control in which the intake air amount (opening degree of the throttle valve 12) or the like is feedback-controlled so that the actual engine rotational speed Ne calculated based on the output signal from the engine rotational speed sensor 101 is matched to a target idle rotational speed. Furthermore, the ECU 300 can execute idle-up control, in which the target idle rotational speed is raised. The idle-up control is, for example, control to increase (up) the idle rotational speed by correcting to increase the fuel injection amount so that the idle rotational speed is matched to the raised target idle rotational speed.

Also, as one of the control of the belt type continuously variable transmission 4, the ECU 300 executes control, for example, to monitor the vehicle speed based on the output signal from the secondary pulley rotational speed sensor 106 and change the gear ratio of the belt type continuously variable transmission 4 toward the maximum gear ratio γmax side when the vehicle speed spd decreases to a predetermined first determination threshold value Thspd 1 (for example, 10 km/h) at the time of deceleration of the vehicle (i.e. spd≤Thspd 1).

By the above-described programs executed by the ECU 300, the control device for the vehicle of the present invention is realized.

—Feedforward/Feedback Control—

Next, description will be given on feedforward control and feedback control executed by the ECU 300.

As described above, the ECU 300 calculates the target gear ratio from the predetermined speed change map using the accelerator opening degree Acc and the vehicle speed spd as parameters, and executes speed change control so as to match the gear ratio γ of the belt type continuously variable transmission 4 to the target gear ratio by controlling the primary sheave hydraulic pressure (hydraulic pressure for speed change control) Pin and the secondary sheave hydraulic pressure (hydraulic pressure for clamping force control) Pd.

In the speed change control, the primary shave hydraulic pressure Pin is feedforward-controlled based on the calculated target gear ratio γtrg and the actual secondary sheave hydraulic pressure Pd. Also, the actual gear ratio γ is calculated based on the rotational speed Nin of the primary pulley 41 and the rotational speed Nout of the secondary pulley 42. Thereby, the primary sheave hydraulic pressure Pin is feedback-controlled so as to match the calculated gear ratio γ to the target gear ratio γtrg. In this way, while the primary sheave hydraulic pressure Pin is controlled, the secondary sheave hydraulic pressure Pd is changed so as to suppress the slip of the belt 43, thus the gear ratio γ is changed.

Here, the secondary pulley rotational speed sensor 106 is an electromagnetic pickup type rotational speed sensor. Due to its nature, when the vehicle speed spd (output shaft rotational speed Nout) is in an extremely low vehicle speed region (for example, 0-2 km/h), detection accuracy may be degraded, or the detection itself may not be performed. For this reason, when the vehicle speed spd is in the extremely low vehicle speed region, for example, at the time immediately before the vehicle stops, it is not possible to detect accurately the rotational speed (output shaft rotational speed) Nout of the secondary pulley 42. In the result, the actual gear ratio γ (γ=primary pulley rotational speed (input shaft rotational speed) Nin/secondary pulley rotational speed (output shaft rotational speed) Nout) cannot be calculated accurately, accordingly it is not possible to perform appropriate feedback control.

In consideration of the above, in this embodiment, the feedback control is shifted to the feedforward control when the vehicle speed obtained by the output signal from the secondary pulley rotational speed sensor 106 is less than a predetermined second determination threshold value Thspd 2. In the extremely low vehicle speed region where the feedforward control is performed, variation due to an individual variability of each belt type continuously variable transmission 4 is considered, and the idle rotational speed of the engine 1 is set high so that the hydraulic pressure is set high in order to secure the hydraulic pressure sufficient to not cause the belt slip and the like due to lack of the hydraulic pressure.

Here, the second determination threshold value Thspd 2 is set to a value (e.g. 3 km/h) higher, by a predetermined amount (margin), than the lower limit value of the vehicle speed spd at which the rotational speed (output shaft rotational speed) Nout of the secondary pulley 42 can be accurately detected by the secondary pulley rotational speed sensor 106.

In the extremely low vehicle speed region as described above, it is possible to secure the detection accuracy of the primary pulley rotational speed sensor 105. That is, in the extremely low vehicle speed region, the gear ratio $\gamma$ of the belt type continuously variable transmission 4 is a value near the maximum gear ratio max (for example, 2.5), and the primary pulley 41 is rotated faster than the secondary pulley 42. Thus, the rotational speed (input shaft rotational speed) Nin of the primary pulley 41 can be detected by the primary pulley rotational speed sensor 105 without problems.

Idle Stop Control

The ECU 300 can perform so-called idle stop control (economical running control), in which the engine 1 is automatically stopped when idle stop conditions (automatic engine stop conditions) are established and is automatically started when an idle stop release condition (automatic engine start condition) is established.

The idle stop conditions are set to include, for example, an on-state of the ignition switch 120 (IG-ON), an accelerator-off (recognized from an output signal of the accelerator opening degree sensor 107), a brake stepping force (recognized from an output signal of the brake pedal sensor 108) more than or equal to a predetermined determination threshold value and a vehicle stop state (in which the vehicle speed spd is zero). Once such idle stop conditions are established, the ECU 300 instructs the fuel injection device 14 to stop fuel injection (fuel cut-off) so that the engine 1 is automatically stopped. In addition to the fuel cut-off, ignition cut-off may be performed.

The idle stop release condition is a condition in which, after establishment of the idle stop conditions, the brake stepping force (recognized from the output signal of the brake pedal sensor 108) becomes less than a predetermined determination threshold value due to, for example, reduction of the brake pedal stepping force. Once such an idle stop release condition is established in a state in which the engine 1 is automatically stopped (idle stop state), the ECU 300 instructs the injection device 14 to start fuel injection and the starter motor (not shown) to run and perform cranking of the engine 1 so that the engine 1 is automatically restarted.

Here, among the above idle stop conditions in this embodiment, different values are used as the determination threshold value of the brake stepping force in respective cases, at the time of stopping the vehicle, that the gear ratio $\gamma$ of the belt type continuously variable transmission 4 becomes the maximum gear ratio $\gamma$max (normal case) and that the gear ratio $\gamma$ of the belt type continuously variable transmission 4 does not become the maximum gear ratio $\gamma$max. That is, a determination threshold value Thbrk 2 for the case that the gear ratio $\gamma$ is not the maximum gear ratio $\gamma$max at the time of stopping the vehicle is larger than a determination threshold value Thbrk 1 for the case that the gear ratio $\gamma$ is the maximum gear ratio $\gamma$max (Thbrk 2>Thbrk 1). The reason is described. In this embodiment, when the gear ratio $\gamma$ does not become the maximum gear ratio $\gamma$max at the time of stopping the vehicle, the idle rotational speed of the engine 1 is set high by the idle-up control (described later for more details). For this reason, a creep force when the engine 1 is restarted is larger than that in the normal case, thus a sudden acceleration of the vehicle is likely to occur. In order to avoid the above, when the gear ratio $\gamma$ does not become the maximum gear ratio $\gamma$max at the time of stopping the vehicle, the engine 1 is automatically stopped conditional on the brake pedal more strongly stepped than (conditional on the brake stepping force larger than) the case in which the gear ratio $\gamma$ becomes the maximum gear ratio $\gamma$max.

Likewise, with regard to the idle stop release condition, when the gear ratio $\gamma$ does not become the maximum gear ratio $\gamma$max at the time of stopping the vehicle, it is determined that the idle stop release condition is established at the time when the brake stepping force becomes less than or equal to the determination threshold value Thbrk 2 by reducing the brake stepping force from the state in which the brake pedal is strongly stepped. Thus, the engine 1 is restarted. When the gear ratio $\gamma$ becomes the maximum gear ratio $\gamma$max at the time of stopping the vehicle (normal case), the engine 1 is restarted at the time when the brake stepping force is less than or equal to the determination threshold value Thbrk 1 by reducing the brake stepping force.

Here, the determination threshold value Thbrk 2 is set to an apprpriate value by experiments and calculations, in consideration of increase of the creep force by the idle-up control (increase of the idle rotational speed).

Hereinafter, the idle stop condition when the gear ratio $\gamma$ of the belt type continuously variable transmission 4 becomes the maximum gear ratio $\gamma$max at the time of stopping the vehicle (normal case) is referred to as an "idle stop condition A1", and the idle stop release condition in the above case (normal case) is referred to as an "idle stop release condition B1". The idle stop condition A1 and the idle stop release condition B1 are described respectively as follows.

The idle stop condition A1: the IG-ON state; the accelerator-off state; the brake stepping force more than or equal to the determination threshold value Thbrk 1; and the vehicle stop state (vehicle speed spd is zero).

The idle stop release condition B1: the brake stepping force less than or equal to the determination threshold value Thbrk 1 by reducing the brake stepping force.

Also, the idle stop condition when the gear ratio $\gamma$ of the belt type continuously variable transmission 4 does not become the maximum gear ratio $\gamma$max at the time of stopping the vehicle is referred to as an "idle stop condition A2", and the idle stop release condition in the above case is referred to as an "idle stop release condition B2". The idle stop condition A2 and the idle stop release condition B2 are described respectively as follows.

The idle stop condition A2: the IG-ON state; the accelerator-off state; the brake stepping force more than or equal to the determination threshold value Thbrk 2; and the vehicle stop state (vehicle speed spd is zero).

The idle stop release condition B2: the brake stepping force less than or equal to the determination threshold value Thbrk 2 by reducing the brake stepping force from the state in which the brake stepping force is more than the determination threshold value Thbrk 2.

In the above description, the respective determination threshold values Thbrk 1 and Thbrk 2 relative to the brake stepping force are not changed in the idle stop condition and in the idle stop release condition. However, the present invention is not limited thereto. The determination threshold value relative to the brake stepping force may be differently set in the idle stop condition and in the idle stop release condition.

[Control at Time of Stopping Vehicle (1)]

Figure 7:
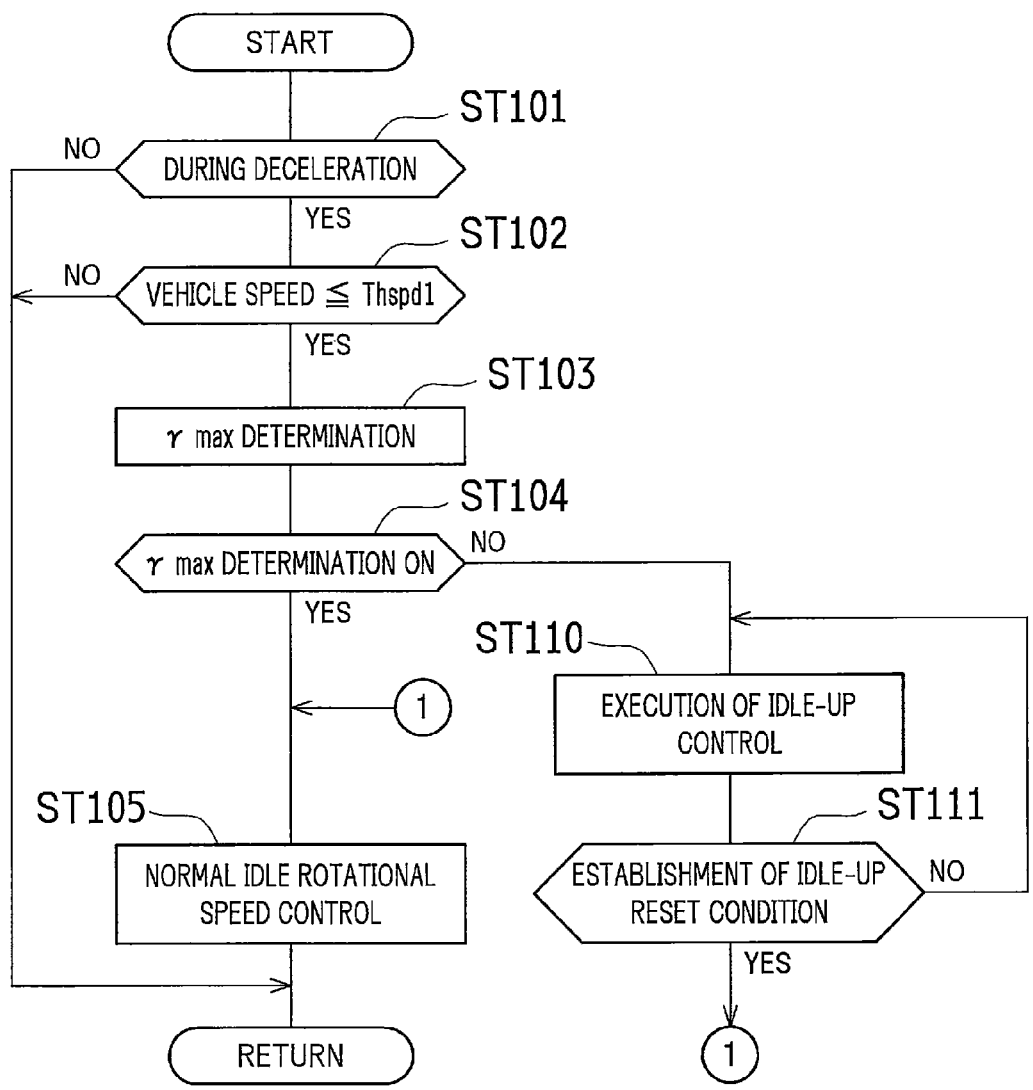
FIG. 7 is a flowchart showing one example of control at the time of stopping the vehicle.
Figure 8:
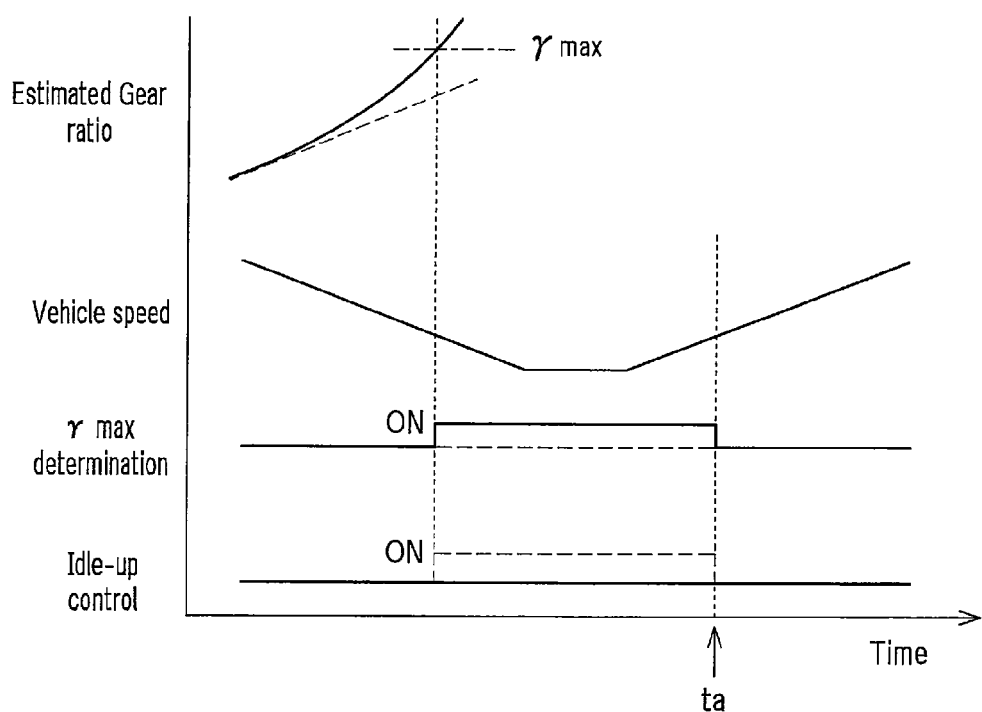
FIG. 8 is a timing chart showing one example of control at the time of stopping the vehicle.

Description will be given on one example of control executed by the ECU 300 at the time of stopping the vehicle (including the time immediately before the vehicle stops) with reference to the flowchart in FIG. 7 and the timing chart in FIG. 8. The control routine in FIG. 7 is repeatedly executed by the ECU 300. In this example, the case that the idle stop control is not performed is shown.

When the control routine in FIG. 7 is started, in step ST 101, it is determined whether the vehicle is decelerating or not based on the vehicle speed spd calculated by the output signal from the secondary pulley rotational speed sensor 106. If the determination result is negative (NO), the procedure returns. If the determination result is affirmative (YES) in step ST 101, the procedure advances to step ST 102.

In step ST 102, it is determined whether the vehicle speed spd that is calculated by the output signal from the secondary pulley rotational speed sensor 106 is less than or equal to the predetermined first determination threshold value Thspd 1. If the determination result is negative (NO), the procedure returns. If the determination result in step ST 102 is affirmative (YES) (in the case of [vehicle speed spd Thspd 1]), the procedure advances to step ST 103.

The first determination threshold value Thspd 1 used for determination processing in step ST 102 is a vehicle speed (for example, 10 km/h) to start the above-described speed change control at the time of deceleration of the vehicle (control to change the gear ratio of the belt type continuously variable transmission 4 toward the maximum gear ratio γmax side).

In step ST 103, the maximum gear ratio γmax (maximum Low) is determined. Specifically, from the time point at which the affirmative determination (YES) is made in step ST 102, a movement amount of the movable sheave 412 of the primary pulley 41 per unit time is sequentially calculated based on the primary sheave hydraulic pressure Pin and the secondary sheave hydraulic pressure Pd. According to the movement amount of the movable sheave 412, the gear ratio γ of the belt type continuously variable transmission 4 is estimated. Then, it is determined whether or not the estimated gear ratio attains the maximum gear ratio γmax before the vehicle speed spd decreases to the second determination threshold value Thspd 2 (for example, 3 km/h). When the estimated gear ratio attains the maximum gear ratio γmax (as shown by the solid line in FIG. 8), it is determined that "γmax determination is ON" (affirmative determination result (YES) in step ST 104), and the procedure advances to step ST 105. On the other hand, when the estimated gear ratio does not attain the maximum gear ratio γmax (as shown by the dashed line in FIG. 8) before the vehicle speed spd decreases to the predetermined second determination threshold value Thspd 2, it is determined that "γmax determination is OFF" (negative determination result (NO) in step ST 104), and the procedure advances to step ST 110.

In step ST 105, the normal idle rotational speed control is performed without the idle-up control. Specifically, when the determination result in step ST 104 is affirmative (YES), the gear ratio of the belt type continuously variable transmission 4 is the maximum gear ratio γmax, and the primary pulley 41 is mechanically locked as described above. Thus, it is not necessary to secure the hydraulic pressure of the primary pulley 41 (primary sheave hydraulic pressure Pin), accordingly it is possible to decrease the hydraulic pressure by such a degree that the primary pulley 41 can be mechanically locked. Therefore, in the normal idle rotational speed control performed in step ST 105, it is sufficient to set the idle rotational speed of the engine 1 in consideration of the hydraulic pressure and the like necessary for the secondary pulley 42, thus, the idle rotational speed can be suppressed to a low value.

On the other hand, when the determination result in step ST 104 is negative (NO), i.e. when the "γmax determination is OFF", the idle-up control is performed in step ST 110, and the idle rotational speed of the engine 1 is set high compared to the normal idle rotational speed (idle rotational speed in the case of the maximum gear ratio γmax). That is, when the gear ratio of the belt type continuously variable transmission 4 is not the maximum gear ratio γmax at the time of stopping the vehicle, it is necessary to control a pulley position of the primary pulley 41 (position of the movable sheave 412) by the hydraulic pressure. Thus, the idle rotational speed is set higher than that in the case of the maximum gear ratio γmax so as to increase the hydraulic pressure. In such a case, an increasing amount (raising amount) of the idle rotational speed is an amount capable of securing the hydraulic pressures of both the primary pulley 41 and the secondary pulley 42, which is sufficient to prevent the belt slip and the like. Such an increasing amount of the idle rotational speed is set to an appropriate value by experiments, calculations and the like.

Here, the timing at which the idle-up control is started is preferably when the feedback control is shifted to the feed-forward control. In this way, to the extent that it is possible to perform appropriate feedback control (i.e. the vehicle speed is in the region where the vehicle speed spd≥Thspd 2), the normal idle rotational speed control can be continued as long as possible. Thus, fuel efficiency can be further improved. Also, the idle-up control can be started immediately after the feedback control is shifted to the feedforward control, thus the belt slip and the like can be further effectively prevented. Note that the timing at which the idle-up control is started may be set in consideration of rising delay of the hydraulic pressure.

Then, while performing the idle-up control, it is determined whether an idle-up reset condition is established or not (step ST 111). Specifically, it is determined whether either one of the two conditions (j1) and (j2) below is established or not.

(j1) The vehicle speed spd is more than or equal to the second determination threshold value Thspd 2.

(j2) The actual gear ratio γ of the belt type continuously variable transmission 4 is the maximum gear ratio γmax.

When both of the two conditions are not established (when the determination result in step ST 111 is negative (NO)), the idle-up control is continued.

On the other hand, if either one of the two conditions (j1) and (j2) is established, the idle-up control is cancelled to return to the normal idle rotational speed control. For example, when the vehicle is restarted after stopping, and the vehicle speed spd becomes more than or equal to the second determination threshold value Thspd 2 (for example, 3 km/h), as shown, for example, in FIG. 8 as the time point ta, in other words, when the feedback control can be appropriately performed due to accurate detection of the rotational speed Nout of the secondary pulley 42 by the secondary pulley rotational speed sensor 106, the idle-up control is cancelled to return to the normal idle rotational speed control. Also, after the vehicle is restarted, when the gear ratio γ of the belt type continuously variable transmission 4 becomes the maximum gear ratio γmax, the idle-up control is cancelled to return to the normal idle rotational speed control.

<Effects>

As described above, in the control in this example, the idle rotational speed is not always set high to increase the hydraulic pressure at the time of stopping the vehicle. Instead, when the gear ratio of the belt type continuously variable transmission 4 is the maximum gear ratio γmax at the time of stopping the vehicle, the normal idle rotational speed control is performed, and only when the gear ratio of the belt type continuously variable transmission is not the maximum gear ratio γmax at the time of stopping the vehicle, the idle-up control is performed so that the hydraulic pressure is set high. Thus, it is possible to improve the fuel efficiency while suppressing generation of the belt slip and the like.

Furthermore, during the idle-up control, when the vehicle speed spd becomes more than or equal to the predetermined second determination threshold value Thspd 2 or when the gear ratio γ of the belt type continuously variable transmission 4 becomes the maximum gear ratio γmax, the idle-up control is cancelled. Thus, the idle-up control is not uselessly continued, accordingly the fuel efficiency can be further improved.

[Control at Time of Stopping Vehicle (2)]

Description will be given on one example of control executed by the ECU 300 at the time of stopping the vehicle (including the time immediately before the vehicle stops) with reference to the flowchart in FIG. 9. The control routine in FIG. 9 can be executed by the ECU 300. In this example, the case that the idle stop control is combined is shown.

Figure 9:
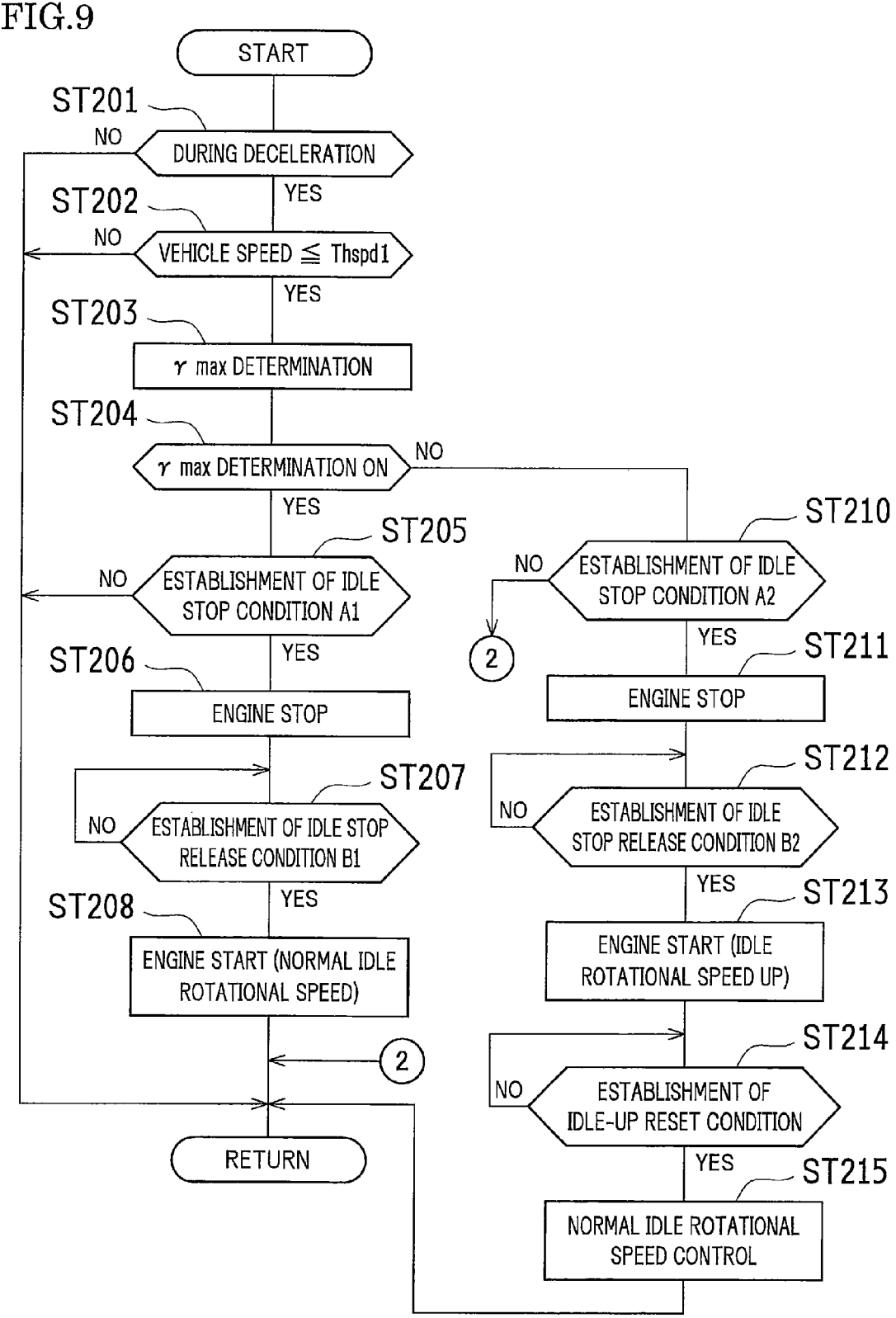
FIG. 9 is a flowchart showing another example of control at the time of stopping the vehicle.

The processing in steps ST 201-ST 204 shown in FIG. 9 is the same as the processing in steps ST 101-ST 104 in the above-described flowchart in FIG. 7. Thus, detailed description is omitted.

In this example, when the determination result in step ST 204 is affirmative (YES), i.e. when "γmax determination is ON", the procedure advances to step ST 205.

In step ST 205, it is determined whether the idle-up condition A1 is established or not. When the idle-up condition A1 is not established (when the determination result in step ST 205 is negative (NO)), the procedure returns. On the other hand, when the idle-up condition A1 is established (when the determination result in step ST 205 is affirmative (YES)), the procedure advances to step ST 206.

In step ST 206, the fuel injection device 14 is instructed to stop fuel injection (fuel cut-off) so that the engine 1 is automatically stopped. After the engine 1 is automatically stopped in this way, it is determined whether the idle stop release condition B1 is established or not (step ST 207). When the determination result is negative (NO), the stop state of the engine 1 is continued. During the idle stop control (during the stop of the engine 1), the hydraulic pressure may be secured by the above-described electric oil pump.

When the idle stop release condition B1 is established (when the determination result in step ST 207 is affirmative (YES)), the fuel injection device 14 is instructed to start fuel injection and the starter motor (not shown) is instructed to run and perform cranking of the engine 1 so that the engine 1 is automatically restarted. When the engine is restarted in such a case, the control is performed to realize the normal idle rotational speed (for example, the idle rotational speed capable of securing the hydraulic pressure of the secondary pulley 42) without the idle-up control.

On the other hand, when the determination result in step ST 204 is negative (NO), i.e. when it is determined that "γmax determination is OFF", the procedure advances to step ST 210.

In step ST 210, it is determined whether the idle-up condition A2 is established or not. When the idle-up condition A2 is not established (when the determination result in step ST 210 is negative (NO)), the procedure returns. On the other hand, when the idle-up condition A2 is established (when the determination result in step ST 210 is affirmative (YES)), the procedure advances to step ST 211.

In step ST 211, the fuel injection device 14 is instructed to stop fuel injection (fuel cut-off) so that the engine 1 is automatically stopped. After the engine 1 is automatically stopped in this way, it is determined whether the idle stop release condition B2 is established or not (step ST 212). When the determination result is negative (NO), the stop state of the engine 1 is continued. During the idle stop control (during the stop of the engine 1), the hydraulic pressure may be secured by the above-described electric oil pump.

When the idle stop release condition B2 is established (when the determination result in step ST 212 is affirmative (YES)), the fuel injection device 14 is instructed to start fuel injection and the starter motor (not shown) is instructed to run and perform cranking of the engine 1 so that the engine 1 is automatically restarted (step ST 213). When the engine is restarted in this way, the idle-up control is performed so as to secure the hydraulic pressures of both the primary pulley 41 and the secondary pulley 42. In such a case, an increasing amount (raising amount) of the idle rotational speed is an amount capable of securing the hydraulic pressures of both the primary pulley 41 and the secondary pulley 42, which is sufficient to prevent the belt slip and the like. Such an increasing amount of the idle rotational speed is set to an appropriate value by experiments, calculations and the like.

Figure 10:
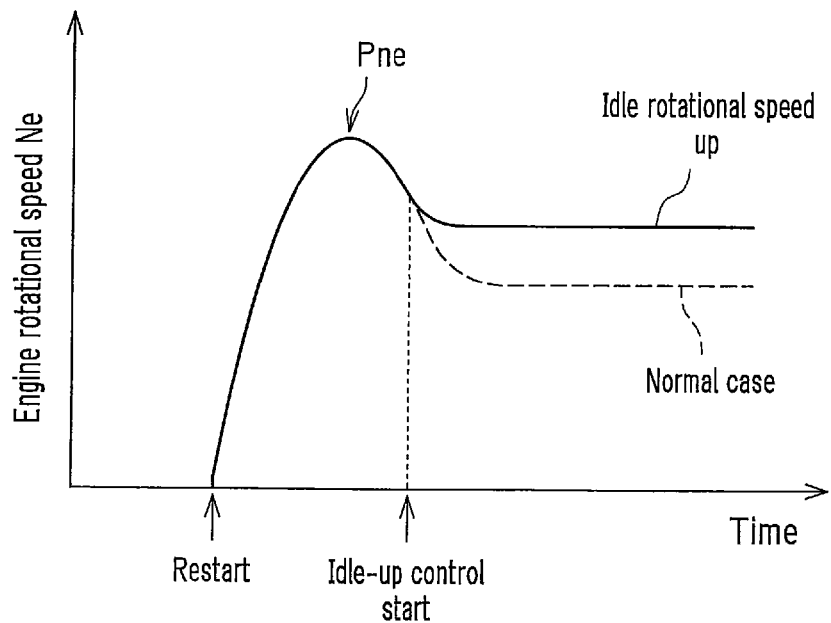
FIG. 10 is a diagram showing one example of idle-up control at the time of restarting an engine.
Figure 10:
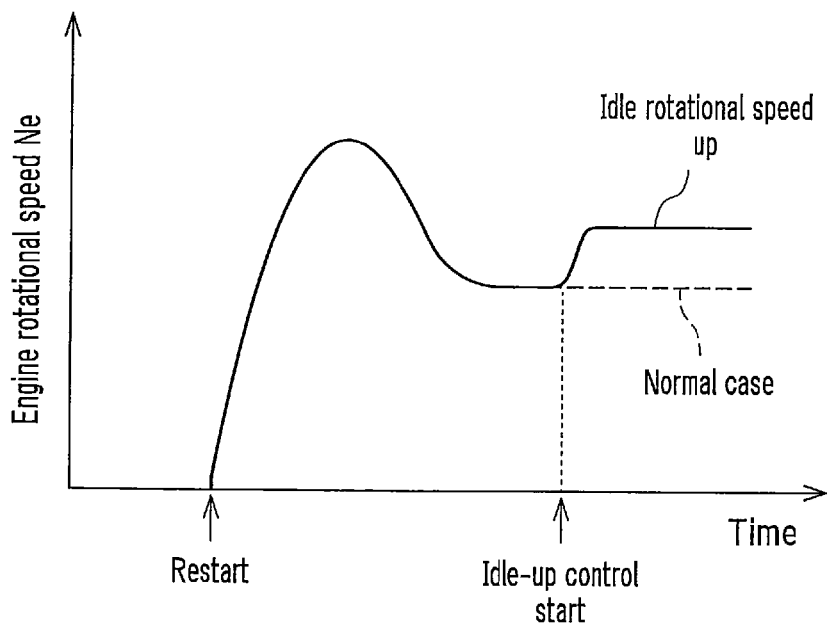

Here, the timing at which the idle-up control is started after the restart of the engine is, as shown in FIG. 10($a$), after the engine rotational speed Ne attains a peak Pne after the restart of the engine 1 and before the idle rotational speed attains the normal rotational speed (the idle rotational speed in the case of the maximum gear ratio γmax). By starting the idle-up control at the above timing, the required hydraulic pressure can be secured immediately after the engine 1 is restarted.

That is, as shown in FIG. 10($b$), if the idle-up control is started when the idle rotational speed becomes stable after the restart of the engine, the hydraulic pressure may not be secured immediately after the restart of the engine because the idle rotational speed is increased after it has been once decreased. In contrast, as shown in FIG. 10($a$), if the idle-up control is started after the engine rotational speed Ne attains the peak Pne after the restart of the engine 1 and before the idle rotational speed is decreased to the normal idle rotational speed, it is possible to suppress the drop in the idle rotational speed as shown in FIG. 10($b$). Thus, the hydraulic pressure can be secured immediately after the engine 1 is restarted.

After the idle-up control is started at the time of restarting the engine, it is determined whether the idle-up reset condition is established or not during the idle-up control (step ST 214.). Specifically, it is determined whether either one of the above two conditions (j1) and (j2) is established or not. When the determination result is negative (NO), i.e. when neither the condition (j1) nor the condition (j2) is established, the idle-up control is continued. On the other hand, when either one of the conditions (j1) and (j2) is established, the idle-up control is cancelled to return to the normal idle rotational control (step ST 215).

<Effects>

As described above, in the control in this example, when the engine 1 is automatically stopped in the state in which the gear ratio γ of the belt type continuously variable transmission 4 is the maximum gear ratio, the normal idle rotational speed control is performed at the time of restarting the engine 1, and only when the engine 1 is automatically stopped in the state in which the gear ratio γ is not the maximum gear ratio, the idle-up control is performed at the time of restarting the engine 1 so that the hydraulic pressure is set high. Thus, it is possible to improve the fuel efficiency while suppressing generation of the belt slip and the like at the time of restarting the engine 1.

Other Embodiments

In the above-described examples, the present invention is applied to the control device for the continuously variable transmission of the vehicle on which the gasoline engine is mounted. However, the present invention is not limited thereto. The present invention may also be applied to a control device for a continuously variable transmission of a vehicle on which another engine such as a diesel engine is mounted. Furthermore, as the power source of the vehicle, it is possible to use, apart from the engine (internal combustion engine), an electric motor or a hybrid power source including both an engine and an electric motor.

Furthermore, the present invention is not limited to be applied to the FF (front engine/front drive) type vehicle, but may be applied to an FR (front engine/rear drive) type vehicle or a 4WD (four wheel drive) type vehicle.

INDUSTRIAL APPLICABILITY

The present invention is suitable for use in a control device for a vehicle on which an engine and a continuously variable transmission are mounted. More specifically, the present invention is suitable for use in a control device for a vehicle on which is mounted a continuously variable transmission capable of mechanically locking a primary pulley at the time of the maximum gear ratio.

REFERENCE SIGNS LIST

1 Engine
4 Belt type continuously variable transmission
8 Oil pump
20 Hydraulic pressure control circuit
41 Primary sheave
411 Fixed sheave
412 Movable sheave
413 Hydraulic pressure actuator
42 Secondary pulley
421 Fixed sheave
422 Movable sheave
423 Hydraulic pressure actuator
43 Belt
105 Primary pulley rotational speed sensor
106 Secondary pulley rotational speed sensor
108 Brake pedal sensor
300 ECU

The invention claimed is:

1. A control device for a vehicle, the vehicle comprising: an engine; and a continuously variable transmission that has a primary pulley to which power of the engine is input, a secondary pulley and a belt wound on the primary pulley and the secondary pulley, and that is capable of mechanically locking the primary pulley at a time of a maximum gear ratio,
   wherein, when a gear ratio of the continuously variable transmission is not the maximum gear ratio although a vehicle state requires the maximum gear ratio, idle-up control is executed so that an idle rotational speed of the engine is set higher than that in a case of the maximum gear ratio.

2. The control device for the vehicle according to claim 1, further comprising a secondary pulley rotational speed sensor that detects a rotational speed of the secondary pulley,
   wherein it is determined whether the gear ratio of the continuously variable transmission is the maximum gear ratio or not when a vehicle speed obtained by an output signal from the secondary pulley rotational speed sensor becomes a predetermined determination threshold value at a time of deceleration of the vehicle.

3. The control device for the vehicle according to claim 1, further comprising a secondary pulley rotational speed sensor that detects a rotational speed of the secondary pulley,
   wherein feedforward control based on a target gear ratio and feedback control based on a deviation between the target gear ratio and an actual gear ratio are performable, and furthermore, the feedback control is shifted to the feedforward control when a vehicle speed obtained by an output signal from the secondary pulley rotational speed sensor becomes a predetermined determination threshold value at a time of deceleration of the vehicle, and
   wherein, when the gear ratio of the continuously variable transmission is not the maximum gear ratio although the vehicle state requires the maximum gear ratio, the idle-up control is started when the feedback control is shifted to the feedforward control.

4. The control device for the vehicle according to claim 1, wherein the idle-up control is cancelled when a predetermined release condition is established during the idle-up control.

5. The control device for the vehicle according to claim 4, wherein the idle-up control is cancelled when a vehicle speed becomes more than or equal to a predetermined threshold value during the idle-up control.

6. The control device for the vehicle according to claim 4, wherein the idle-up control is cancelled when the gear ratio of the continuously variable transmission becomes the maximum gear ratio during the idle-up control.

7. The control device for the vehicle according to claim 1, wherein idle stop control is performable to automatically stop the engine when a predetermined stop condition is established and to restart the automatically stopped engine when a predetermined restart condition is established, and
   wherein, when the engine is restarted after the engine is automatically stopped in the state in which the gear ratio of the continuously variable transmission is not the maximum gear ratio, the idle-up control is started after an engine rotational speed attains a peak for a first time and before the engine rotational speed attains the idle rotational speed in the case of the maximum gear ratio.

8. The control device for the vehicle according to claim 7, wherein, when the engine is automatically stopped in the state in which the gear ratio of the continuously variable transmission is not the maximum gear ratio, the engine is restarted under a condition in which a brake stepping force is reduced from a state in which the brake stepping force is large compared to when the engine is automatically stopped in the case of the maximum gear ratio.

9. The control device for the vehicle according to claim 1, wherein idle stop control is performable to automatically stop the engine when a predetermined stop condition is established and to restart the automatically stopped engine when a predetermined restart condition is established, and wherein, when the gear ratio of the continuously variable transmission is not the maximum gear ratio at a time of stopping the vehicle, the engine is automatically stopped under a condition in which a brake stepping force is large compared to the case of the maximum gear ratio.

* * * * *